United States Patent [19]

Uetake et al.

[11] Patent Number: 5,715,290
[45] Date of Patent: Feb. 3, 1998

[54] REACTOR WATER CONTROL METHOD IN BWR POWER PLANT, BWR POWER PLANT HAVING LOW RADIOACTIVITY CONCENTRATION REACTOR WATER AND FUEL CLAD TUBE FOR BWR

[75] Inventors: Naohito Uetake, Katsuta; Masayoshi Kondoh, Hitachi; Makoto Nagase, Mito; Hideyuki Hosokawa; Teruo Hara, both of Hitachi; Yamato Asakura, Katsuta; Katsumi Ohsumi, Hitachi; Kazuhiko Akamine, Katsuta; Kouichi Yamane, Hitachi, all of Japan

[73] Assignee: Hitachi, Ltd., Tokyo, Japan

[21] Appl. No.: 260,472

[22] Filed: Jun. 14, 1994

[30] Foreign Application Priority Data

Jul. 1, 1993 [JP] Japan ................... 5-163563

[51] Int. Cl.[6] ........................ G21C 19/28
[52] U.S. Cl. ............... 376/306; 376/267; 376/416; 376/417
[58] Field of Search ............... 376/305, 306, 376/416, 417, 267

[56] References Cited

U.S. PATENT DOCUMENTS

| | | | |
|---|---|---|---|
| 3,615,885 | 10/1971 | Watson et al. | 148/6.3 |
| 4,722,823 | 2/1988 | Honda et al. | 376/306 |
| 4,828,790 | 5/1989 | Honda et al. | 376/306 |
| 4,894,202 | 1/1990 | Nagase et al. | 376/306 |
| 4,927,598 | 5/1990 | Nishino et al. | 376/306 |
| 4,940,564 | 7/1990 | Aizawa et al. | 376/306 |
| 4,986,957 | 1/1991 | Taylor | 376/417 |
| 5,015,436 | 5/1991 | Nagase et al. | 376/306 |
| 5,245,642 | 9/1993 | Lin | 376/310 |
| 5,398,269 | 3/1995 | Nagase et al. | 376/306 |

FOREIGN PATENT DOCUMENTS

| | | | |
|---|---|---|---|
| 57-52558 | 11/1982 | Japan | 376/416 |
| A 59-137883 | 8/1984 | Japan . | |
| A 61-196189 | 8/1986 | Japan . | |
| 62-38388 | 2/1987 | Japan | 376/416 |
| A 63-103999 | 5/1988 | Japan . | |
| 3-37594 | 2/1991 | Japan . | |
| 2172737 | 9/1986 | United Kingdom | 376/416 |

Primary Examiner—Kathryn L. Gorgos
Assistant Examiner—Chrisman D. Carroll
Attorney, Agent, or Firm—Antonelli, Terry, Stout & Kraus, LLP.

[57] ABSTRACT

In reactor water control for a BWR power plant during an operation cycle after loading new fuel rods in the BWR power plant, an operation is performed which accelerates deposition of crud on the fuel rods until the deposition amount of the crud on the fuel rods reaches a predetermined target value within the operation cycle concerned. After the deposition amount of the crud has reached the predetermined target value, the crud deposition accelerating operation is terminated, whereby even when loading new fuel rods such as Zr liner type fuel rods having a surface on which metal ion deposition has been difficult, radioactivity in the reactor water is efficiently reduced.

6 Claims, 7 Drawing Sheets

FIG. 11
FIG. 12
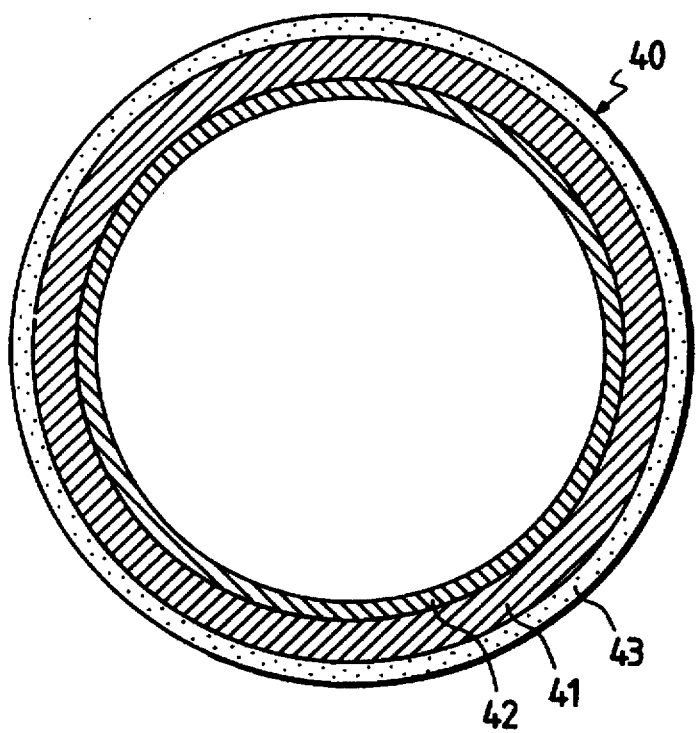
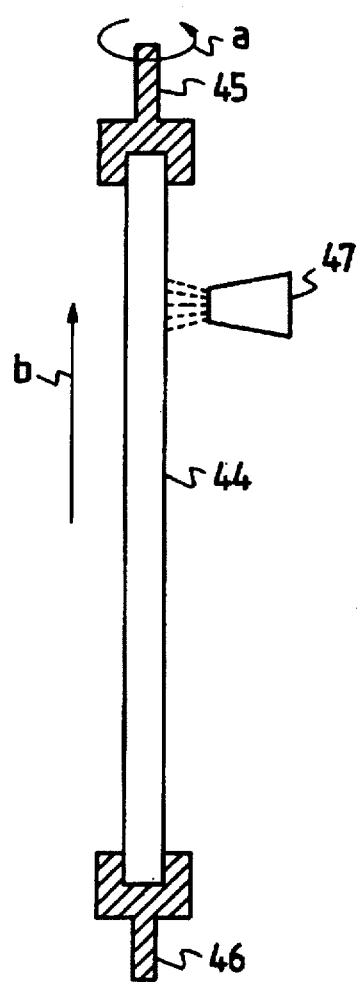

REACTOR WATER CONTROL METHOD IN BWR POWER PLANT, BWR POWER PLANT HAVING LOW RADIOACTIVITY CONCENTRATION REACTOR WATER AND FUEL CLAD TUBE FOR BWR

FIELD OF THE INVENTION

The present invention relates to a reactor water control method in a BWR power plant, a BWR power plant having low radioactivity concentration reactor water and a fuel clad tube for a BWR power plant; and, in particular the invention relates to reactor water control, in a BWR power plant which is suitable for reducing the radioactivity concentration in the reactor water thereof.

JP-A-62-85897(1987) and JP-A-63-90796(1988), for example, disclose reactor water control in a BWR power plant for reducing the radioactivity concentration in the reactor water.

In JP-A-62-85897(1987), a ratio (Fe/Ni) between iron concentration and nickel concentration in a BWR feed water line is controlled so as to be maintained above a predetermined value; and further, when the ratio Fe/Ni in the feed water line drops below the predetermined value, an Fe oxide suspension and an Fe hydroxide suspension are injected into the feed water line.

On the one hand, in JP-A-63-90796(1988), which corresponds to U.S. Pat. No. 4,894,202, a preliminary operation by nuclear heating is performed after loading new fuel rods in a reactor while injecting iron ions into the cooling water so as to form an iron oxide layer on the respective surfaces of the fuel rods, and thereafter the injection amount of the iron ions is reduced and the Fe/Ni molar concentration in the cooling water is adjusted to be maintained at from about 2 to 10.

In the above described conventional control systems, the ions having radioactivity are changed into ferrites on the surface of the fuel rods by controlling the ratios between such elements as iron and nickel within a predetermined range and the ions are thus removed from the reactor water.

However, the above described conventional control is based on a condition that the deposition speed of metal ions in the reactor water on the surface of the fuel rods is sufficiently high; whereas, the present inventors have found that in case of fuel rods having a flat surface, such as a Zr liner type fuel rod metal ions having radioactivity in the reactor water can not be efficiently removed, because the metal ion deposition speed on such fuel rods is low and the deposition of iron crud and radioactive metal ions on the surface of the fuel rods, which has to be caused before the ferriting reaction, is insufficient.

SUMMARY OF THE INVENTION

An object of the present invention is to provide reactor water control, for a BWR power plant, which can efficiently reduce radioactivity in the reactor water, even when using new fuel rods, which are unlikely to cause deposition of metal ions, such as a Zr liner type fuel rod.

The above object of the present invention is achieved by performing an operation which accelerates crud deposition on fuel rods, so as to elevate the crud deposition amount on new fuel rods to a predetermined target value in the operation cycle concerned and by terminating the operation after the crud deposition amount has reached the predetermined target value.

More specifically, the above object of the present invention is achieved by setting the crud deposition target value on the fuel rods for newly loaded fuel rods at more than 30 $\mu g/cm^2$ on the average; and, further, the crud deposition accelerating operation on the fuel rods is effected by using at least one of a high concentration iron crud injection, a low solubility metal element injection and a reactor operation at alkaline condition.

More specifically, the above object of the present invention is achieved by continuing injection of iron and a low solubility metal element in an initial stage of an operation cycle after loading new fuel rods until the sum thereof reaches a predetermined amount which exceeds a product of 30 $\mu g/cm^2$ multiplied by a value representing the total surface area of all of the newly loaded nuclear fuel rods, and, thereafter, by terminating the injection.

More specifically, the above object of the present invention is achieved by using at least one element selected from Be, Zr, Al, Nb, Y and Ti for the above low solubility metal element.

More specifically, the above object of the present invention is achieved by controlling the pH of the reactor water in the initial stage of an operation cycle after loading new fuel rods in a range greater than 7 and less than 9, and, after a predetermined period in the same operation cycle, by reducing the pH of the reactor water below 7.

More specifically, the above object of the present invention is achieved by providing a device which acceleratingly forms an oxide layer on the surface of the newly loaded fuel assemblies during starting operation of the BWR power plant.

More specifically, the above object of the present invention is achieved by increasing the concentration of metal elements contained in the feed water during a starting operation of the BWR power plant in comparision with that which exists during steady state operation thereof, so as to permit an accelerated formation of a metal oxide deposition layer on the surface of the newly loaded fuel assemblies.

More specifically, the above object of the present invention is achieved by injecting a depositable metal element at the upstream side of a feed water heater, as well as by injecting a transition metal, as the above mentioned depositable metal element, so as to increase the amount of the metal element contained in the feed water.

More specifically, the above object of the present invention is achieved by setting the metal oxide deposition density, which is determined by an accumulated amount of the injected metal elements from the feed water line over the entire surface area of the fuel assemblies, at more than 100 $\mu g/cm^2$, and further by reducing the concentration of the injecting metal elements contained in the cooling water at the moment when the deposition density of the metal oxides exceeds over 100–400 $\mu g/cm^2$ during the starting operation period or the rated output operation period.

More specifically, the above object of the present invention is achieved by controlling the concentration of the injected metal element in molar concentration with respect to the Ni concentration in the feed water at the moment of the concentration reduction operation at a value not less than 2, as well as by providing a concentration enriching device of metal elements in the feed water and a control device of enriched amount of the metal elements as the device for acceleratingly forming the metal oxide layer on the surface of the newly loaded fuel assemblies.

More specifically, the above object of the present invention is achieved by forming a metal oxide layer on at least a part of the outer surface of fuel clad tubes.

More specifically, the above object of the present invention is achieved by forming a metal oxide layer on at least a part of the outer surface of fuel clad tubes by flame spraying the metal oxide.

More specifically, the above object of the present invention is achieved by forming a metal oxide layer on at least a part of the outer surface of fuel clad tubes by dipping the same in the metal oxide suspension and then by heat-drying the same.

More specifically, the above object of the present invention is achieved by forming a metal oxide layer on at least a part of the outer surface of fuel clad tubes by coating the same with either a metal oxide suspension or a solution containing metal ions and then by drying the same.

More specifically, the above object of the present invention is achieved by increasing the thickness of the metal oxide layer to more than 10 μm, by setting the void ratio of the metal oxide layer at more than 5% or by using at least one element selected from Be, Al, Ti, Fe, Y, Zr, Nb and Mo for the metal elements forming the metal oxide layer.

It is understood that the deposition of metal ions and crud on fuel rods in a BWR is caused in association with boiling phenomenon at the fuel rod surface and is considered different from deposition on the surface of elements such as pipings where no boiling occurs. For evaluating the deposition due to boiling a deposition efficiency is evaluated which makes use of a deposition speed coefficient, as shown in the following equation (1)

$$dW/dt = KQC/L \qquad (1)$$

wherein
W: deposition amount (g/cm$^2$)
dW/dt: deposition speed
K: deposition speed coefficient
Q: heat flux
C: metal ion concentration in reactor water
L: heat of vaporization In the reactor water, impurities such as metal ions and crud originating from corrosion products are contained and a part of the impurities are radioactivated in the reactor water by neutrons. Among these radioactivated impurities, $^{58}$Co and $^{60}$Co are, in particular, problematic and have comparatively long half-lives and a strong radioactivity, and a part of these radioactivated ions is deposited on fuel rods in association with boiling occurrence. These radioactivated ions deposited on the fuel rods react with iron crud deposited in the same manner on the fuel rods in association with boiling occurrence and become anchored on the fuel rods in a form of stable iron series oxides having a low solubility, such as ferrite, whereby they are removed from the reactor water. In this way, it is possible to reduce the radioactivity in the reactor water. However, this method is based on a high deposition efficiency of iron crud and metal ions, including radioactivated ions, on the fuel rods and is applicable for conventional fuel clad tubes which are provided with oxide films on the outer surface thereof via autoclave oxidization.

However, since the autoclave oxidization treatment is omitted for fuel rods using Zr liner clad tubes and the deposition speed coefficient of crud and metal ions thereon is low, the anchoring of radioactivated ions on the fuel rods is insufficient and the reactor water radioactivity is likely to rise. FIG. 1 is an experimental result illustrating deposition speed coefficient ratio of many metal ions between a conventional fuel clad tube (RJ) and a Zr liner fuel clad tube (BJ). For the Zr liner fuel clad tube the deposition speed coefficient of metal ions is low, in particular, at the initial stage, in that, it is less than 1/10 of that for the conventional fuel clad tube. However, even in the Zr liner fuel clad tube, the deposition speed coefficient rises depending on an increase of the crud deposition. The rising rate of the deposition speed coefficient is steep at the initial stage and becomes gentle above a deposition density of 30 μg/cm$^2$, and the difference thereof from the conventional fuel clad tube becomes small. For this reason, after the crud deposition on the fuel rod advances beyond the above value, it is understood that the anchoring of the radioactivated ions on the fuel rod effectively advances in the same manner as in the conventional fuel clad tube. Namely, even in the Zr liner fuel clad tube if crud deposition greater than a predetermined amount is caused at the initial stage, the reactor water radioactivity can be likely reduced.

The curve in FIG. 1 applies to all metal ions, in that, there are no differences between metal ions so that regardless of the kinds of metals to be deposited, any metals will likely effect an increase in the deposition speed coefficient, which effect is based on the fact that the primary surface of the Zr liner fuel clad tube is covered by crud deposition and then subsequent crud deposits on the already deposited crud which operates to increase the deposition efficiency. It is assumed that the deposition density of 30 μg/cm$^2$ corresponds to the condition wherein the primary surface of the Zr liner fuel clad tube is substantially covered by crud. The amount surely depends on such factors as the atomic weights of the metals; however, the curve in FIG. 1 is obtained on the basis of metals such as Cu, Mn, Co, Ni, Cr and Fe having atomic weights which are close to each other, and so no appreciable differences can be observed on the curve in FIG. 1. For metals having a larger atomic weight, the above indicated necessary amount of deposition density will be increased some.

As explained above, it is enough if a measure is applied which accelerates crud deposition on the fuel rods at an initial stage of the reactor operation after new fuel rods of a Zr liner fuel clad tube are loaded. More specifically, at least one of the following three measures is applied.

(1) Without controlling the ratio of iron concentration with regard to that of another metal component, iron is fed in a high concentration into the feed water in order to accelerate the deposition thereof on the fuel rods.

(2) Metal ions other than iron having a low solubility and a high deposition speed coefficient are fed into the feed water so as to deposit the same on the fuel rods.

(3) the pH in the reactor water is controlled at a high level so as to accelerate the deposition of metal ions on the fuel rods.

These measures can be performed alone or in combination, however these measures can also cause hazardous results; therefore, it is preferable to terminate the operation in the operation cycle concerned when the deposition density has reached a necessary amount and these operations are performed every time new Zr liner fuel clad tubes are loaded until sufficient crud has been deposited on the newly loaded fuel rods. The iron crud injection has been practiced in order to control the concentration ratio with another metal component being constant and has been performed either via an electrolytic iron injection device or a condensed water demineralizing bypass. The above measure (1) can be performed via one of the above two measures. However, when applying these measures, it is necessary to increase the concentration of iron to be injected, as well as to terminate the operation at the midway point of the one cycle concerned. Although it is impossible to directly measure the deposition amount on the fuel rods during operation of the reactor, the concentration of iron crud in the feed water can be measured, such that by making use of the measured concentration, the deposition amount can be calculated based on a predetermined calculation code. The iron crud injecting operation can be controlled by making use of the calculated deposition amount; however, since the total injection amount, which is determined by the product of 30 $\mu g/cm^2$ and the sum of the entire surface area of the newly loaded nuclear fuel rods, is used to obtain the necessary deposition density of 30 $\mu g/cm^2$, when iron crud is injected in a possible high concentration, which does not disturb the operation of the injection device and other processes, while using the determined total injection amount as a target value, a substantial portion of the injected iron crud finally deposits on the fuel rods. When some loss of the injected iron is estimated, a larger target value in view of the loss is determined for the iron crud injection. When iron has been injected up to a target value, a sufficient anchoring of radioactivated ions can be effected, and no iron crud injection is needed thereafter. Further, when applying the measure (2), the same target value as used in the measure (1) can be used for the control. Still further, when the measures (1) and (2) are used in combination, respective target values are determined so that the total deposition amount or injection amount effected by both measures reaches the above explained reference value.

When a hardly soluble metal ion other than iron is injected, a substantial part of the injected ion changes into a solid in the reactor even when the metal is in the form of an ion during the injection, and so a metal in a form of solid particle can be directly injected. Since the injected metal ion deposits on the surface of the fuel rods, it is preferable that the metal has a small neutron absorption cross sectional area in view of neutron economy; and further, since a part of the injected metal dissolves into the reactor water after being radioactivated, it is preferable that the solubility of the metal is as low as possible, so that the level of the produced radioactivity thereof also will be as low as possible or the half-life thereof will be as short as possible. Table 1 lists the hardly soluble metals according to their neutron absorption cross sectional area arranged from the smallest one together with their produced radioactivity. It will be understood from Table 1 that Be, Zr, Al, Nb, Y and Ti are preferable as the hardly soluble metal ions.

TABLE 1

| kind of metal | neutron absorption cross sectional area(b) | solubility product (hydroxide) | daughter nucleide half-life (maximum) | radioactivity saturation value (mCi) |
| --- | --- | --- | --- | --- |
| Be | 0.01 | $10^{-21}$ | $10^6 y$ | 0.017 |
| Mg | 0.063 | $10^{-11}$ | 9.46m | 0.0028 |
| Pb | 0.17 | $10^{-7}$ | $10^7 y$ | 0.0007 |
| Zr | 0.18 | $10^{-52}$ | $10^6 y$ | 0.0096 |
| Al | 0.23 | $10^{-32}$ | 2.24m | 0.14 |
| Zn | 1.1 | $10^{-17}$ | 244d | 0.14 |
| Nb | 1.15 | $10^{-71}$ | $10^4 y$ | 0.2 |
| Y | 1.31 | $10^{-22}$ | 64.1m | 0.23 |
| Fe | 2.53 | $10^{-39}$ | 2.7y | 0.038 |
| Cr | 3.1 | $10^{-30}$ | 27.7d | 0.22 |
| Ti | 5.8 | $10^{-69}$ | 5.8m | 0.0032 |
| Co | 37 | $10^{-16}$ | 5.27y | 15.7 |

When the reactor is operated in alkaline side reactor water, the deposition speed coefficient of the metal ion is increased, which advances deposition thereof on the fuel rods. The process of the metal ion deposition is understood as follows, in that, due to water condensation at the surface of the fuel rods in association with water vapor production, the solubility of the metal ion is exceeded and precipitated; and further, the water is excluded due to bubble growth, and so the distance between the precipitate and the surface of the fuel rod is shortened to thereby cause an adhesive force. Further, when the solubility is reduced, the metal ion is likely to deposit, which is achieved by shifting the pH of the reactor water to the alkaline side. Since the above phenomena can be applied to metal ions originating from the corrosion products existing in the reactor water, the crud deposition on the fuel rods is increased only by shifting the pH in the reactor water to the alkaline side; however, when the measures (1) and (2) are combined therewith, the crud deposition is further accelerated. On the other hand, corrosion of the fuel clad tubes is extremely accelerated by alkaline reactor water; therefore, it is undesirable to shift the pH in the reactor water more than 9, in which condition an accelerated corrosion is induced. Further, in view of the influence of the water condensation due to boiling, the corrosion can be accelerated even below pH 9, and it is preferable to return the pH in the reactor water to below 7 immediately after the deposition amount has reached the target value.

Further, the BWR power plant according to the present invention is provided with a device which acceleratingly forms a metal oxide layer on the surface of newly loaded fuel assemblies during the starting operation.

As explained above, as well as understood from FIG. 1, regardless of the kinds of metal elements to be deposited on the fuel rods, when crud in an amount greater than a predetermined amount is deposited at the initial stage, the deposition speed coefficient of the metal element increases. Accordingly, by acceleratingly forming a metal oxide layer on the surface of the fuel assemblies during the starting operation of the BWR power plant, subsequent crud can be easily deposited on the already deposited crud, whereby the crud deposition efficiency thereafter is increased.

Further, during the starting operation after loading new fuel assemblies in the BWR power plant, a metal oxide layer can be acceleratingly formed on the surface of the newly loaded fuel assemblies by increasing the concentration of the metal element contained in comparison with that present during steady-state operation, as well as by injecting a depositing metal element at the upstream side of a feed water heater.

Still further, a metal oxide layer can be efficiently formed on the surface of the newly loaded fuel assemblies, such as by injecting transition metal elements other than Fe, such as Zn and Al, as the depositing metal element, by setting the injecting metal oxide deposition density at more than 100 $\mu g/cm^2$, by reducing the concentration of the injecting oxide forming metal contained in the cooling water at the moment when the injecting metal oxide deposition density exceeds 100–400 $\mu g/cm^2$, and further by controlling the molar concentration of the injecting oxide forming metal during reduction thereof with respect to the concentration of Ni in the feed water, so that it is not to reduced below 2.

Moreover, when fuel assemblies in which no metal oxide film forming treatment is applied on the surface of the fuel clad tubes during manufacture of the fuel rods is used as newly loaded fuel assemblies, a concentration enriching device for the metal element in the feed water and a control device enriching the amount of the metal element are provided in accordance with the present invention. Further, the metal element enriching amount control device controls the enriching amount of the metal element by making use of the deposition densities of the metal element and Ni on the surface of the fuel assemblies as parameters which are calculated based on the concentrations of the metal and Ni in the feed water. With this measure, even when fuel assemblies, to which no metal oxide film forming treatment has been applied are newly loaded, and a metal oxide layer is surely formed on the surface thereof.

Now, since the Zr liner type fuel clad tube is provided with an inner liner of pure zirconium, which is not provided for the conventional fuel clad tube, the autoclave treatment, which was usually performed on the conventional fuel clad tubes, can not be performed on the Zr liner type fuel clad tubes. For this reason the outer surface of the Zr liner type fuel clad tubes is treated by a mechanical polishing. Due to modification of the outer surface treatment of the fuel clad tubes, the impurities in the reactor water can not easily deposit on the outer surface of the Zr liner type fuel clad tubes. Therefore, the radioactivated impurities in the reactor water can not be easily trapped on the fuel clad tubes so that there arises a possibility of increasing the radioactivity of the reactor water.

The precipitation of metal ions, metal compounds and metal particles in the reactor water on the outer surface of the fuel clad tubes is caused by the boiling phenomenon. The boiling occurs on the outer surface of the fuel clad tubes in such a way that, at first, a small bubble is created at a base point on the outer surface of the fuel clad tube and this bubble grows gradually and finally the enlarged bubble leaves the outer surface of the fuel clad tube. In these processes, at the moment when the water changes into the gas phase, in that water vapor, elements such as the metal ions, metal compounds and metal particles contained in the reactor water precipitate at the outer surface of the fuel clad tube forming the base point of the bubble. This phenomenon commonly occurs both for the conventional fuel clad tubes and for the newly developed Zr liner type fuel clad tubes. Since the outer surface of the conventional fuel clad tubes is covered by a porous zirconium oxide layer, which is formed by the autoclave treatment during the manufacturing process of the fuel clad tubes, the precipitating impurities can easily deposit thereon. On the other hand, since the outer surface of the newly developed Zr liner type fuel clad tubes is polished and smooth, impurities once deposited thereon can likely drop off and return to the reactor water. For this reason, the precipitation of impurities, such as metal ions contained in the reactor water, on the Zr liner type fuel clad tube is delayed. Further, during the precipitation of the metal ions in the reactor water, the metal ions change into metal oxides, the chemical reaction of which is expressed in the following chemical formula while taking the iron ion as an example.

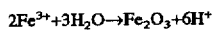

$$2Fe^{3+}+3H_2O \rightarrow Fe_2O_3+6H^+$$

Therefore, for the fuel clad tubes according to the present invention, a porous metal oxide layer is formed on the outer surface of the fuel clad tubes before loading the fuel rods, whereby the surface area of the fuel clad tubes is increased on which metal ions, metal compounds and metal particles in the reactor water are able to precipitate, and the surface thereof is roughened, which accelerates the deposition while preventing the once precipitated impurities from dropping off from the surface.

The reason for forming a metal oxide layer having a thickness greater than 10 μm on the fuel clad tube is that the fuel clad tube having a layer thickness of such order shows substantially the same trapping ability for the metal ions and crud as that of the conventional fuel clad tube which has been subjected to the autoclave treatment, which will be understood from FIG. 1. More particularly, it will be understood from FIG. 1 that when a deposition density of any metal oxides on the Zr liner type fuel clad tube exceeds 100 μg/cm², the Zr liner type fuel clad tube shows substantially the same order of deposition speed coefficient as that of the fuel clad tube subjected to the autoclave treatment. Since the densities of the exemplified metal oxides are in range of 2~10 g/cm², the minimum layer thickness converted from the above deposition density is 10 μm. Further, from FIG. 1, it will be understood that the deposition speed coefficient is simply determined by the deposition density on the Zr liner type fuel clad tube, in that the layer thickness is not affected by the kinds of metal element used.

The reason for controlling the void ratio of the metal oxide layer to more than 5% is as follows. The role of the metal oxide layer to be formed is to provide a place on which metal ions and crud precipitate and deposit, and is different from that of an anti-corrosion film, which is designed to prevent contact between zircaloy and water. Due to the porous metal oxide layer, water easily penetrates inside the metal oxide layer, which increases the thermal conductivity thereof via the penetrating water and accelerates the boiling. Further, due to the comparatively roughened surface, rather than the mechanically polished smooth surface, the precipitates easily deposit thereon; and further, the depositable surface area is increased, both of which features causes the precipitation and depositing to be are accelerated. By controlling the void ratio of the metal oxide layer to more than 5% the above indicated purposes are achieved.

The reason for using flame spraying or the suspension of metal oxides for forming the metal oxide layer on the outer surface of the fuel clad tube is to easily form a metal oxide layer thereon without affecting the pure zirconium on the inner surface of the Zr liner type fuel clad tube. Since there is no pure zirconium liner in the conventional fuel clad tube, the autoclave treatment can easily be applied thereto. However, if the autoclave treatment is applied to the Zr liner type fuel clad tube as it is, the zirconium liner is oxidized and can not serve for relaxing PCI (Pellet Clad Interaction).

If it is required to apply the autoclave treatment to the Zr liner type fuel clad tube, it is necessary first to seal both ends of the fuel clad tube such as by welding so as to keep the inside of fuel clad tube in an inert gas atmosphere, and then to cut off one of the welded ends so as to insert fuel pellets and finally to seal the fuel pellets by welding again the end plug, which are very time consuming processes. On the other hand, the formation of the metal oxide layer on the fuel clad tube, by making use of flame spraying or the suspension of metal oxides according to the present invention, requires no severe conditions with regard to temperature and pressure, in comparison with those required during the autoclave treatment, and requires no complete sealing of the end plugs, and on some occasions, no sealing of end plugs are required at all. Further, after assembling the fuel rod by filling fuel pellets into a fuel clad tube and by welding the end plugs, the metal oxide layer can be formed on the outer surface thereof. Therefore, the formation of the metal oxide layer on the outer surface of the Zr liner type fuel clad tube can be performed easily, in comparison with metal oxide film formation via the autoclave treatment, on the Zr liner type fuel clad tube.

Almost all of the impurities which accumulate on the outer surface of the fuel clad tube in the nuclear reactor are iron oxides. Therefore, in view of a slight influence on the neutron economy in the nuclear reactor, as well as a low exposure during regular inspection of the nuclear reactor, properties required for metal elements which form the metal oxide layer on the outer surface of the fuel clad tube are to have the same degree of activation cross section as that of iron, and a short half-life of the generated radioactivity and a radioactivity accumulation which is equal to or less than that of iron results. Further, it is important that produced hydroxides do not react with water. Examples of metal oxides which satisfy the above requirements are oxides of Be, Al, Ti, Fe, Y, Zr, Nb and Mo, and among these oxides, Be oxide having a very small activation cross section and Al oxide and Ti oxide which are hardly accumulated in radioactive form are, in particular, desirable.

Further, since the metal oxide layer for the fuel clad tube according to the present invention can be formed outside the reactor, an inspection of the formed metal oxide layer can be easily performed and the thickness and the void ratio thereof can be easily adjusted.

BRIEF DESCRIPTION OF THE DRAWINGS

FIG. 11 is a cross sectional view of a fuel clad tube for a BWR according to the present invention;

FIG. 12 is an exemplary view of a device which forms a metal oxide layer on the outer surface of a fuel clad tube according to the present invention;

DETAILED DESCRIPTION OF THE EMBODIMENTS

Hereinbelow, embodiments according to the present invention will be explained with reference to the drawings.

Figure 2:
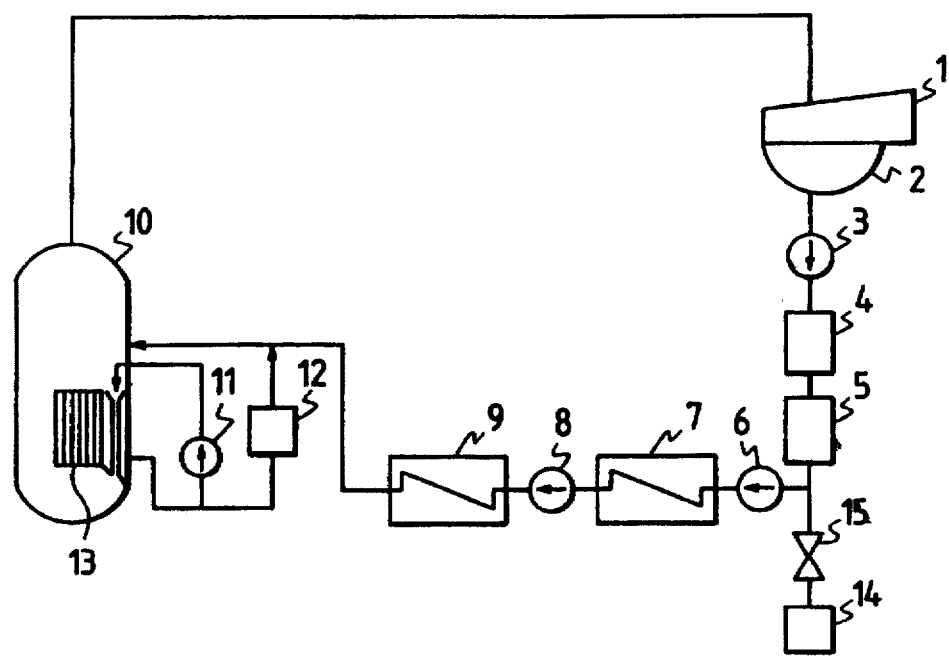
FIG. 2 is a system diagram of an embodiment according to the present invention.
Figure 3:
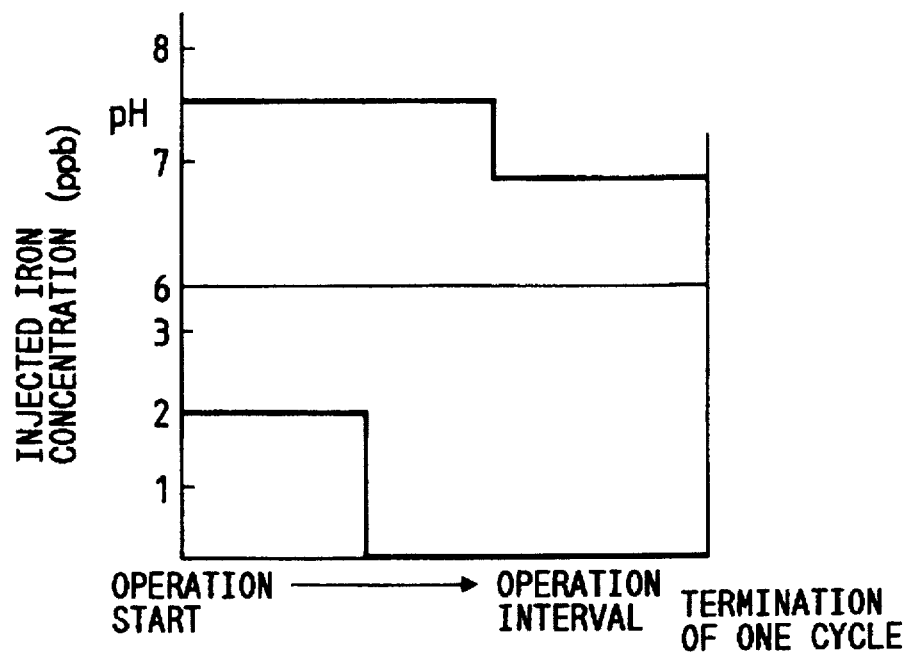
FIG. 3 is a diagram illustrating control of the iron concentration and pH in feed water in the embodiment of FIG. 1.

FIG. 2 is a system diagram of an embodiment according to the present invention and FIG. 3 is a diagram illustrating an example of the control of iron concentration and pH in the feed water.

The embodiment illustrated in FIG. 2 shows a BWR power plant which is started after newly loading Zr liner type fuel rods, i. e., fuel assemblies, wherein the steam flowing out from a turbine 1 is condensed into water at a condenser 2 and impurities in the condensed water from the condenser 2 are removed while being pumped through a condenser filter 4 and a condensate demineralizer 5 by a condensed water pump 3. The cleaned water is then led to a nuclear reactor pressure vessel 10 via a feed water pump 6, a low pressure feed water heater 7, a booster pump 8 and a high pressure feed water heater 9. Therefore, the reactor water contains metal ions such as iron crud, Ni and Co, which are corrosion products produced primarily in the high pressure feed water heater 9 and the nuclear reactor pressure vessel 10. Although a part of these corrosion products is removed through a purification system 12, which is connected to a piping branched out from an upstream side of a nuclear reactor recirculating pump 11, the removal ratio thereof is low, thus almost all of the corrosion products remain in the reactor water and on the surface of the fuel rods.

Before starting the operation of the reactor, new Zr liner type fuel rods 13 are loaded in the nuclear reactor pressure vessel 10. After starting the operation, the output of the nuclear reactor increases and boiling is caused at the surface of the fuel rods. In response to the occurrence of boiling crud is iron generated through operation of an electrolytic iron injecting device 14 and the produced iron cruds are injected into the feed water via an injection valve 15. The concentration of the injected iron crud is controlled so as to be kept constant at about 2 ppb and the injection is terminated when the total amount of the injected iron has reached a value equal to the product of 50 µg/cm$^2$ and the value of the total surface area (cm$^2$) of the newly loaded nuclear fuel rods. Further, positive ion exchange resin in the condensate demineralizer 5, comprising a plurality of towers, is partly changed to the Na type and the condensed water is passed therethrough to increase the pH thereof and to maintain the pH of the feed water at 7.5. The operation of the reactor at a pH of 7.5 is continued for a while after terminating the iron crud injection, and then the water feeding into the resin tower filled with the Na type positive ion exchange resin is terminated and the water feeding is changed-over to other resin towers, thereby to reduce the pH down to 6.5 and then to continue the operation until the end of one operation cycle, which is schematically illustrated in FIG. 3.

According to the present embodiment as explained above, at the time of the starting operation, after loading the new Zr liner type fuel rods 13 in the BWR power plant, an operation which accelerates crud deposition on the Zr liner type fuel rods is incorporated in order that the crud deposition amount on the Zr liner type fuel rod 13 reaches a predetermined target value at the starting operation stage. When the crud deposition amount reaches the predetermined target value, the operation accelerating the crud deposition is terminated.

Since the autoclave oxidation treatment is omitted for the Zr liner type fuel rods 13, the deposition speed coefficient (k) of such materials as crud and metal ions is small. In particular, as seen from FIG. 1, the deposition speed coefficient (k) of metal ions on the Zr liner type fuel rod 13, in particular at the operation start stage, is small, in that less than 1/10 of that of the conventional fuel clad tubes. For this reason, anchoring of the radioactive ions on the fuel rods is insufficient, which tends to raise the radioactivity of the reactor water. However, on one hand, even with the Zr liner type fuel rods 13, the deposition speed coefficient (k) increases in accordance with an advance of the crud deposition. Therefore, according to the embodiment, during the initial stage of the starting operation, after loading new Zr liner type fuel rods 13, an operation for accelerating the crud deposition is designed to be performed. Accordingly, the deposition speed coefficient (k) of such materials as crud and metal ions on the Zr liner type fuel rods 13 is increased and the deposition efficiency thereof is increased. As a result, the radioactivity in the reactor water can be reduced.

Further, with the present embodiment, the crud deposition target value on the Zr liner type fuel rods 13 is set at 30 μg/cm$^2$ for newly loaded fuel rods.

The increase of the crud deposition speed coefficient (k) on the Zr liner type fuel rods 13 is steep at the initial stage of the starting operation and then becomes gentle when the deposition density exceeds 30 μg/cm$^2$, at which the difference with the conventional fuel clad tubes disappears.

Therefore, in the present embodiment, the crud deposition target value on the newly loaded Zr liner type fuel rods 13 is set at 30 μg/cm$^2$ on the average. Accordingly, after the crud is deposited on the Zr liner type fuel rod with more than 30 μg/cm$^2$, it is understood that the anchoring of the radioactive ions on the Zr liner type fuel rods 13 advances like the conventional fuel clad tubes.

Further, in the present embodiment, the operation of accelerating the crud deposition on the Zr liner type fuel rod 13 can be performed either by iron crud injection in a high concentration, low solubility metal element injection or alkaline side operation alone or combinations thereof.

Still further, when performing the low solubility metal element injection it is preferable to use at least one of Be, Zr, Al, Nb, Y and Ti as the low solubility metal elements.

Figure 4:
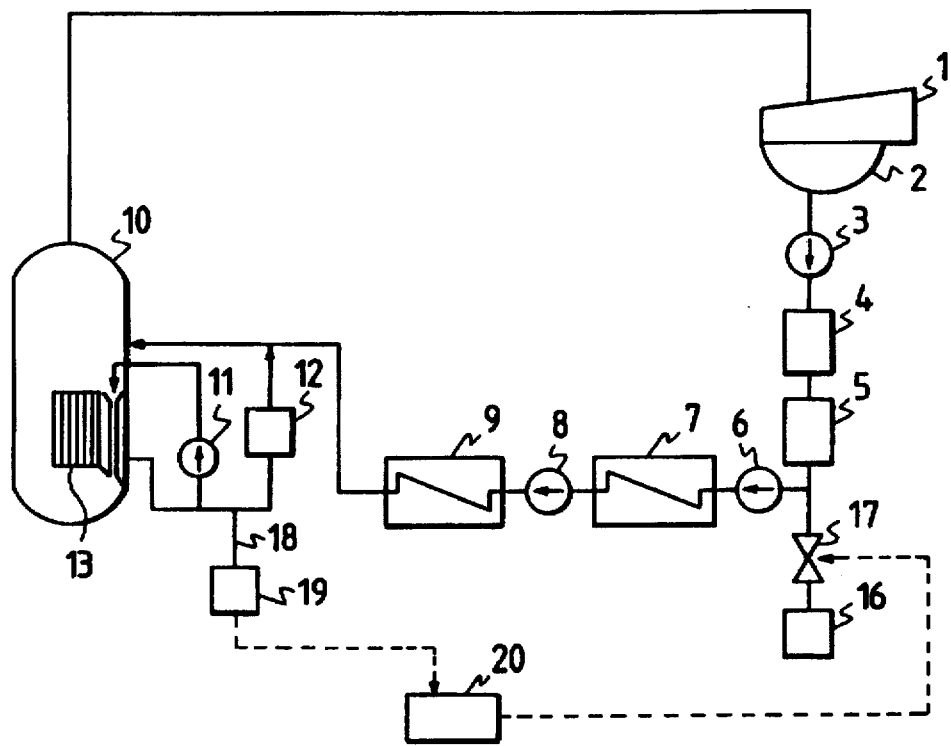
FIG. 4 is a system diagram of an embodiment according to the present invention.

FIG. 4 is a system diagram illustrating another embodiment according to the present invention.

The embodiment shows an example to which the present invention is applied, wherein ⅓ of the fuel rods are replaced by new Zr liner type fuel rods, and the BWR power plant itself is the same as that shown in FIG. 2.

Now, in this embodiment, ⅓ of the fuel rods 13 are replaced by the Zr liner type fuel rods, and the operation thereof is again started after completing a regular inspection. After starting the operation and boiling on the surface of the fuel rod is caused, Zr ions are injected into the feed water from a Zr ion injecting device 16 via an injection valve 17, and the injection amount thereof is controlled so that the Zr concentration in the feed water is kept at about 50 ppb. The injected Zr ions efficiently deposit on the fuel rods 13 in the form of ZrO$_2$ and accelerate deposition of radioactive ions on the fuel rods. The deposited radioactive ions react corrosion products, such as iron cruds and are anchored in a stable form. The Zr concentration in the reactor water is sampled out via a sampling piping 18 and the concentration thereof is measured via a metal ion concentration measuring apparatus 19. The measured concentration data is sent to a computer 20, wherein the Zr deposition amount on the newly loaded fuel rods is calculated by making use of a calculation code. At the moment when the calculated value has reached 50 μg/cm$^2$, the injection valve 17 is closed and the Zr ion injection is terminated.

As a result, according to this embodiment, even in the BWR power plant in which ⅓ of the fuel rods are replaced with Zr liner type fuel rods, deposition of materials such as crud and metal ions, on the fuel rods is accelerated at the initial stage during starting operation, the anchoring of the radioactive ions is achieved and the radioactivity in the reactor water can be reduced.

Figure 5:
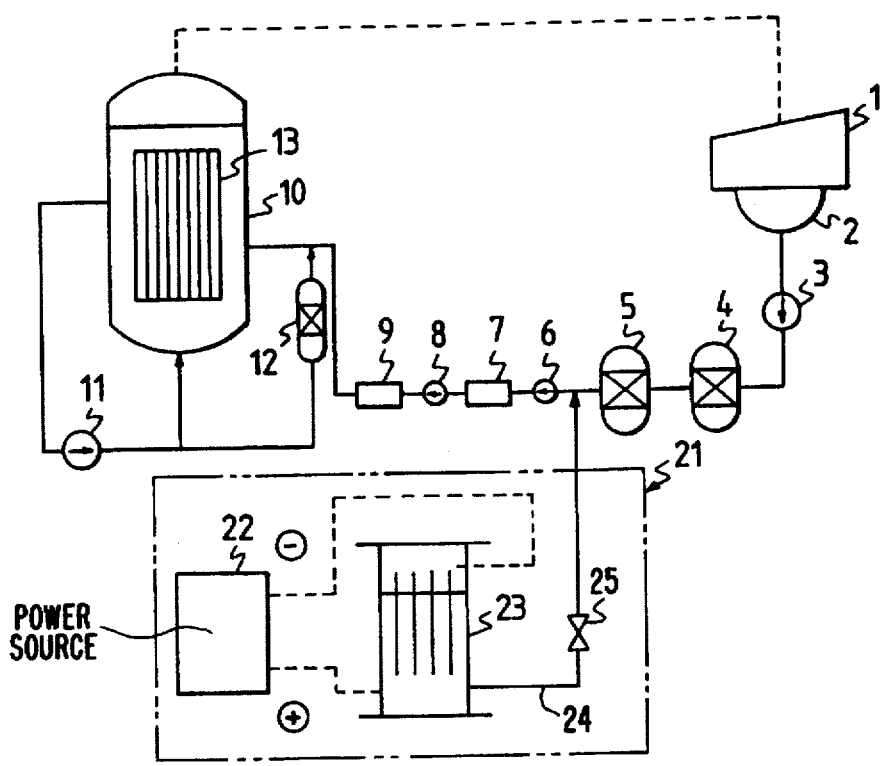
FIG. 5 is a system diagram of another embodiment according to the present invention.
Figure 6:
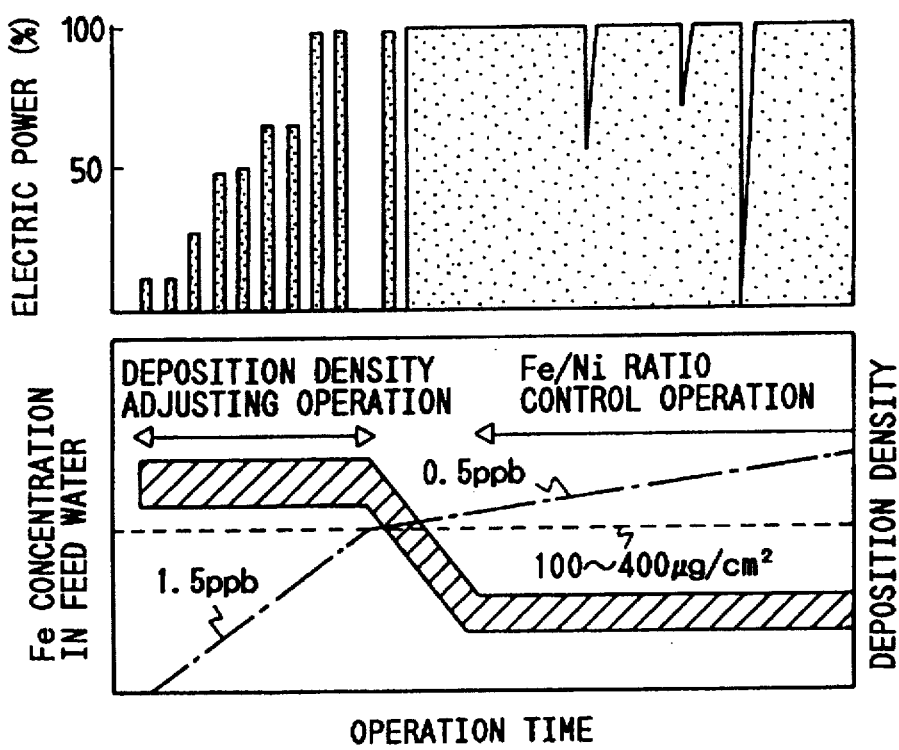
FIG. 6 is an operating characteristic diagram of the embodiment of FIG. 5.

FIG. 5 is a system diagram of a further embodiment according to the present invention, and FIG. 6 is an operating characteristic diagram of this embodiment.

The embodiment illustrated in FIG. 5 shows an example of BWR power plants of a low reactor water radioactivity, wherein an electrolytic iron injecting device 21 is provided as a device which acceleratingly forms a metal oxide layer on the surface of newly loaded fuel assemblies.

The electrolytic iron injecting device 21 is constituted by a power source 22 for the electrolysis, an electrolytic cell 23 electrically connected thereto, a piping connecting the electrolytic cell 23 with the upstream side of the feed water pump 6 and an injection valve 25 disposed in the piping 24.

Now, the electrolytic iron injecting device 21 is operated in association with the starting operation of the BWR power plant after newly loading the fuel assemblies 13, such as the Zr liner type fuel rods, in the nuclear reactor pressure vessel 10, and the device 21 produces iron ions by the electrolytic cell 23 and injects the produced iron ions from the upstream side of the feed water pump 6 via the piping 24 and the injection valve 25. In this instance, for a predetermined period after starting the BWR power plant, for example, a period of about 2000 hours, the concentration of injecting iron ions is set at a constant value of 1.5 ppb and injected accordingly, as illustrated in FIG. 6, in order that the iron ions are caused to deposit rapidly on the surface of the fuel assemblies and the injected metal oxide deposition density, which is determined by dividing an accumulated injection amount with the total surface area of the fuel assemblies, exceeds 100 μg/cm$^2$, so as to accelerate the formation of the metal oxide layer of iron ions. Thereafter, at the moment when the injected metal oxide deposition density exceeds over 100–400 μg/cm$^2$, the concentration of injected iron ions is lowered down to 0.5 ppb to thereby reduce the concentration of the injected metal element contained in the reactor water. However, when reducing the concentration of the injected metal element contained in the cooling water, the molar concentration thereof during the reduction period with regard to the Ni concentration in the feed water has to be controlled so as not to drop below 2.

According to this embodiment, as has been explained, a metal oxide layer of iron ions can be acceleratingly formed on the newly loaded fuel assemblies 13 during the starting operation of the BWR power plant. As a result, the reactor water radioactivity during the operation of the BWR power plant is effectively reduced.

The other constitutions and functions of the embodiment illustrated in FIG. 5 are as same as those of the embodiment illustrated in FIG. 2.

In the embodiment described with reference to FIG. 5, the iron ions produced in the electrolytic iron injecting device 21 are injected into the cooling water as they are, however, iron ions can be injected in a form of insoluble particles, such as iron oxides and iron hydroxides (iron crud), after subjecting the iron ions to an oxidizing treatment, such as by air, before injection thereof, while enjoying substantially the same advantages.

Figure 7:
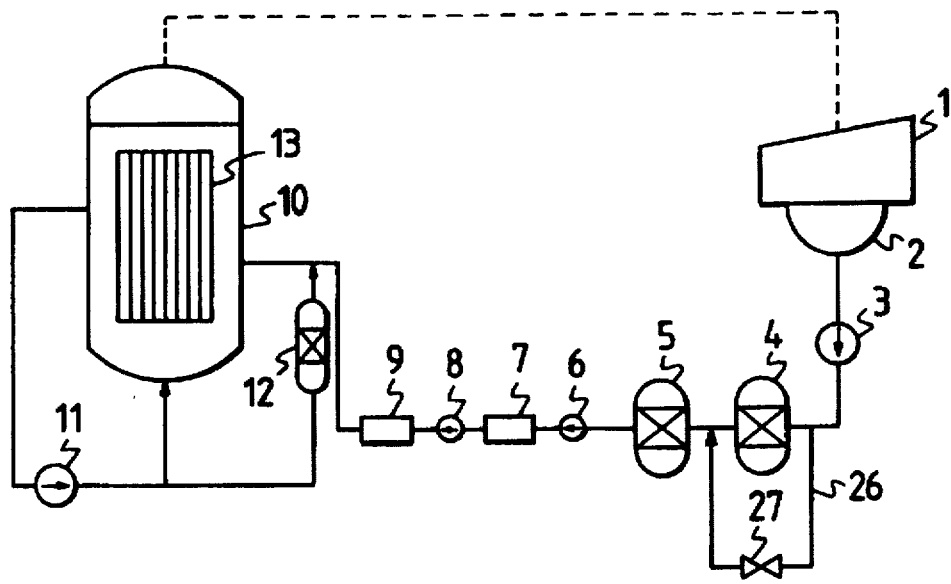
FIG. 7 is a system diagram of a further embodiment according to the present invention.
Figure 8:
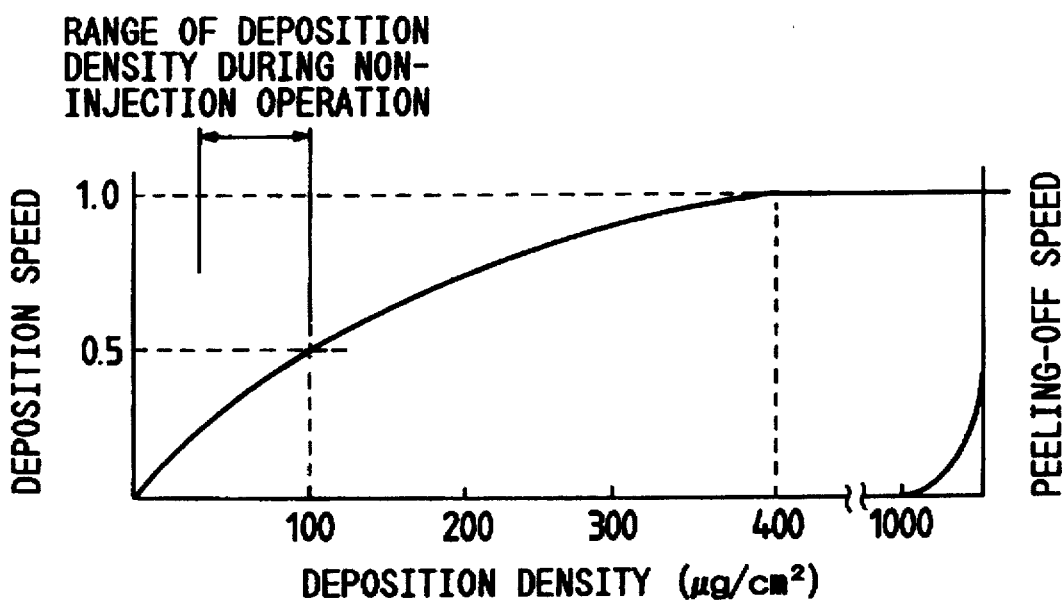
FIG. 8 is an operating characteristic diagram of the embodiment of FIG. 7.

FIG. 7 is a system diagram illustrating a further embodiment according to the present invention, and FIG. 8 is an operation characteristic diagram of the embodiment.

In the embodiment illustrated in FIG. 7, a bypass 26 of the condensed water filter 4, serving as a condensed water purifying device, and a bypass valve 27 in the bypass 26 are provided between the condensed water line and the feed water line as a device for acceleratingly forming a metal oxide layer on the surface of the newly loaded fuel assemblies.

In this embodiment, particles of iron ions, iron oxides or iron hydroxides, which are produced in company with corrosion of the plant constituting materials in the condensed water line, are added to the feed water, while bypassing the condensed water filter 4 and raising the concentration of metal elements, such as iron ions, contained in the feed water during starting operation after newly loading the fuel assemblies 13 in the nuclear reactor pressure vessel 10, in comparison with that during steady-state operation thereof. An adjustment of the added amount of such iron ions is performed by controlling the opening degree of the bypass valve 27.

With this measure, a metal oxide layer can be acceleratingly formed on the surface of the fuel assemblies 13 by making use of elements as iron ions contained in the condensed water, as shown in FIG. 8, without injecting such iron ions from the outside into the cooling water.

Other constitutions and functions of this embodiment are as same as those of the embodiment explained above with reference to FIG. 4.

In accordance with the present invention, metal elements, such as iron ions, also can be injected, for example, from the upstream side of the low pressure feed water heater 7 which serves as a feed water heater and is disposed in the feed water line of the BWR power plant, so as to increase the concentration of metal elements contained in the feed water.

Figure 9:
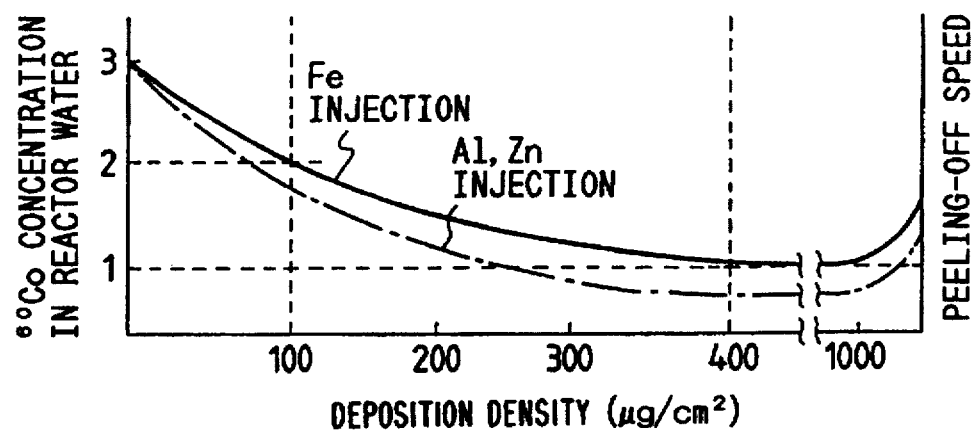
FIG. 9 is a diagram for explaining an operation according to the present invention.

FIG. 9 is a diagram illustrating a relationship between injected metal oxide deposition density and $^{60}$Co concentration in the reactor water for explaining the present invention in which Al or Zn is injected into the feed water in place of Fe.

In the present embodiment, crud or metal ions which are injected into the feed water or the cooling water can be metal elements other than Fe. Further, in such a case, it is preferable that these metals be able to react with Ni and Co depositing on the surface of the fuel assemblies to form compounds having a smaller solubility than those of Ni and Co oxides, in particular transition metals, such as Zr, Cr and Al, are preferable because these metals react with Ni and Co to form spinel oxides having a low solubility.

Figure 10:
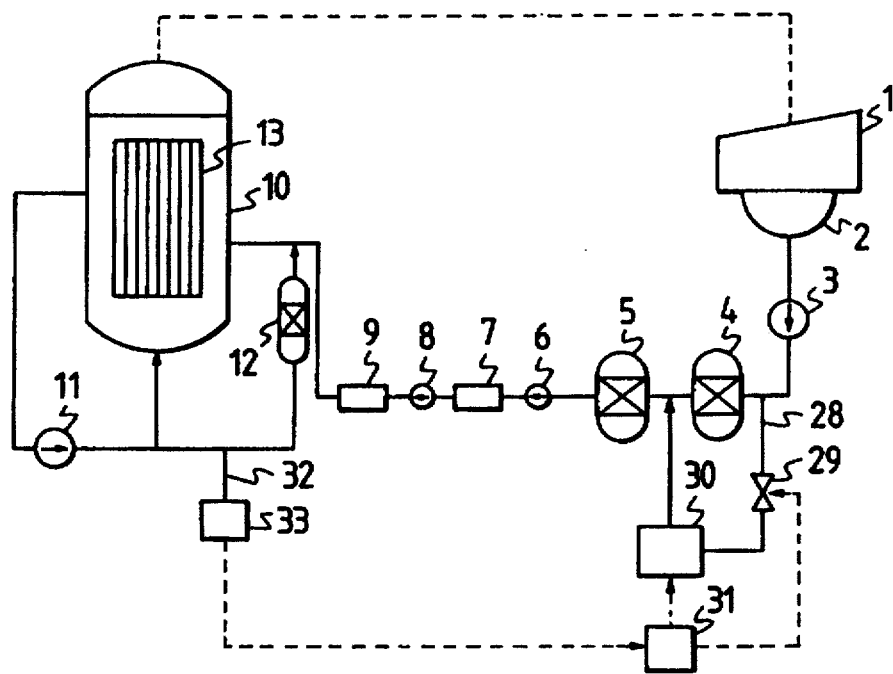
FIG. 10 is a system diagram of an embodiment according to the present invention.

FIG. 10 is a system diagram illustrating still another embodiment according to the present invention.

The embodiment as illustrated is composed of a water extract piping 28, an extracting valve 29 and a metal element concentration enriching device 30, both provided in the water extract piping 28, a control unit 31 connected to the metal element concentration enriching device 30 and a metal ion concentration measuring device 33, which is disposed at the upstream side of the nuclear reactor purification system 12 via a sampling-out piping 32 and further connected to the control unit 31. For the metal element concentration enriching device 30, a device which enriches concentration of metal elements in the feed water by means, such as by blowing oxygen to the metal, may be employed and by heat-treating the metal elements. The control unit 31 calculates the enriched amount of the metal elements using the deposition density of the metal elements and Ni on the surface of the fuel assemblies as parameters, which are calculated based on the measured concentration value of the metal elements in the reactor water and the concentrations of the metal elements and Ni in the feed water, and controls the metal element concentration enriching device 30 based on the calculated value. The metal ion concentration measuring device 33 is designed to measure a current concentration of metal ions in the reactor water and inputs the measured value to the control unit 31.

In the present embodiment, after loading into the nuclear reactor pressure vessel 10 the fuel assemblies 13, which have not been subjected to metal oxide film forming treatment on the surface of the fuel clad tubes during manufacture of the fuel rods, and during starting operation of the BWR power plant, the condensed water is extracted from the upstream side of the condensed water filter 4 via the extract water piping 28 and the extract water valve 29, and the extracted water is transferred to the metal element concentration enriching device 30. The metal element concentration enriching device 30 operates to dissolve metal elements into the extracted water, enriches the metal element concentration according to a command from the control unit 31 and then adds the enriched extracted water at a point between the condensed water filter 4 and the condensate demineralizar 5. Thereby, the formation of a metal oxide layer is accelerated on the surface of the newly loaded fuel assemblies 13 during starting operation of the BWR power plant, and accordingly the radioactivity in the reactor water can be reduced.

FIG. 11 is a cross sectional view illustrating an example of fuel clad tubes for BWRs according to the present invention.

As illustrated the fuel clad tube 40 is consisted by a fuel clad tube main body 41, a liner layer 42 formed on the inner surface thereof and a metal oxide layer 43 formed on the outer surface of the fuel clad tube main body 41.

The fuel clad tube main body 41 in accordance the present invention is made of zircaloy 2.

The liner layer 42 is made of pure zirconium and is lined on the inner surface of the fuel clad tube main body 41, and with the liner layer 42 and the fuel clad tube main body 41 a so-called Zr liner type fuel clad tube is constituted.

The metal oxide layer 43 is formed by using a metal oxide having a stability against water which is comparable to or greater than that of iron oxides, and in a preferred embodiment, the metal oxide layer 43 is made of beryllium oxide (BeO). Further, the metal oxide layer 43 is formed on the outer surface of the fuel clad tube main body 41 with a layer thickness of 35 μm and a void ratio of more than 5%.

Figure 1:
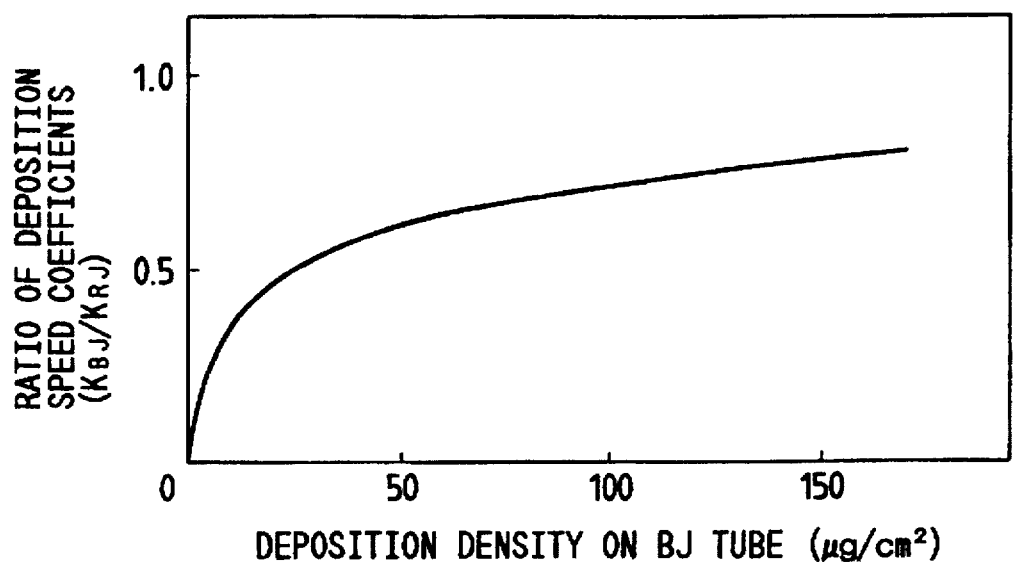
FIG. 1 is a diagram illustrating a measurement result of deposition speed coefficient of metal ions on fuel clad tubes.

As will be understood from the above explanation and from the diagram of FIG. 1, the deposition speed coefficient of the Zr liner type fuel rods becomes comparable with that of the conventional fuel clad tube which is subjected to the autoclave treatment when the deposition density of any metal oxides exceeds about 100 μg/cm². Further, since the densities of many metal oxides, which can be used, are in a range of 2~10 g/cm³, the minimum layer thickness converted from the above deposition density is 10 μm. Further, even with the Zr liner type fuel rods, when crud in an amount more than a predetermined amount is deposited at the initial stage during starting operation of the BWR power plant, the subsequent crud can easily deposit on the already deposited crud which increases the deposition speed coefficient and raises the deposition efficiency. Accordingly, it is preferable to form a metal oxide layer having a thickness greater than 10 μm at least on a part of the outer surface of the fuel clad tube main body 41.

Further, the formation of the metal oxide layer 43 is for providing a place permitting precipitation and deposition of metal ions and crud in the reactor water, so that it is desirable to form the layer in a porous form which permits water to easily penetrate into the inside of the metal oxide layer, improves the thermal conductivity via the water and promotes the boiling. Still further, it is desirable to determine the void ratio thereof so that it is more than 5%, which increases the surface area thereof and facilitates deposition of the precipitates.

In the present embodiment, as explained above a metal oxide layer 43 of beryllium oxide is formed on the outer surface of the fuel clad tube main body 41 having a liner layer 42 of pure zirconium representing a Zr liner type fuel rod with a layer thickness of 35 μm and with a void ratio of more than 5%, whereby impurities such as metal ions in the reactor water, can be precipitated and deposited to the same extent as in the conventional fuel clad tube which has been subjected to the autoclave treatment, even when not subjecting the Zr liner type fuel rod to the autoclave treatment. Accordingly, such elements as metal ions can be desirably deposited on the surface of the fuel rod without using a specical device which is designed to deposit the metal ions for the newly loaded fuel rod, thereby to reduce the radioactivity in the reactor water.

Further, since the beryllium oxide shows a good thermal conductivity, the layer 43 of about 35 μm thickness formed on the outer surface of the fuel clad tube main body 41 rarely affects a temperature rise within the fuel clad tube. Further, beryllium in the beryllium oxide has an extremely small reaction cross section with respect to a thermal neutron, being 1/300 of that of iron, so that the beryllium rarely affects the neutron economy in the nuclear reactor.

In accordance with the present invention, a titanium dioxide ($TiO_2$) layer may be formed on the outer surface of the fuel clad tube main body 41 in place of the beryllium oxide layer as the metal oxide layer 43. In this arrangement titanium dioxide layer is formed on the entire surface of the fuel clad tube main body 41 with a layer thickness of 25 μm and a void ratio of 5%. The avantages of using titanium is that, although the reactive cross section of the titanium with respect to thermal neutrons is relatively large, up to two times that of iron, the half-life of the produced radioactive elements is extremely short and no accumulation of radioactivity occurs, so that substantially no influence with regard to radiation exposure during regular inspection is caused.

Further, since the thermal conductivity of titanium dioxide is small in comparison with berylium oxide, it is presumed that the temperature rise in the fuel clad tube is affected; however, according to an estimating calculation, the temperature rise is about 3° C. higher, which raises no problems.

Figure 13:
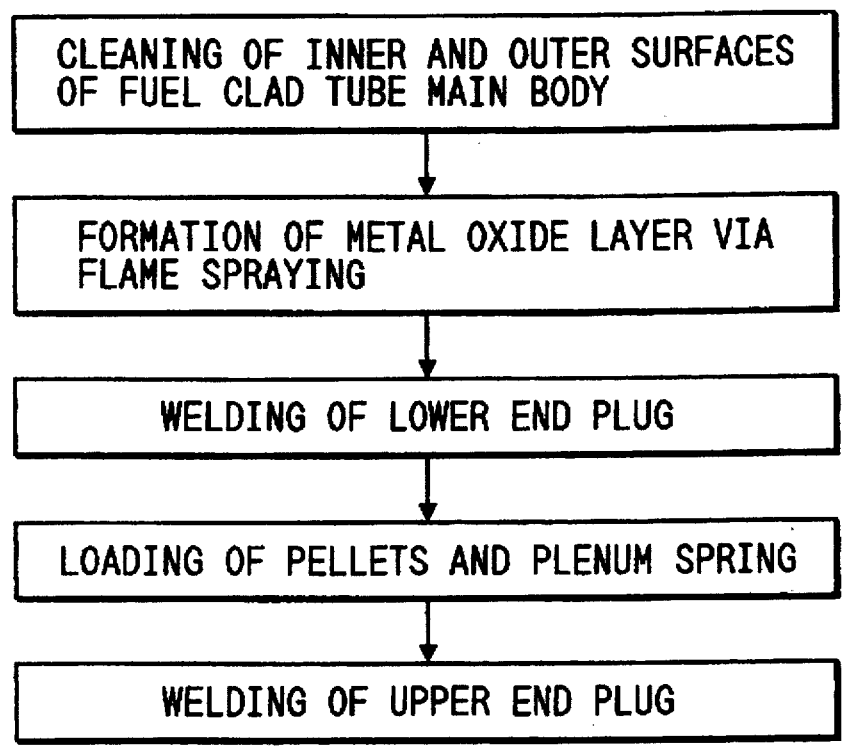
FIG. 13 is a view for explaining manufacturing processes of the fuel rod of FIG. 12.

FIG. 12 is a schematic view illustrating an example of a device which forms a metal oxide layer on the fuel clad tube main body according to the present invention, and FIG. 13 is a diagram for explaining manufacturing processes of the fuel rod by making use of the device in FIG. 12.

In the device illustrated in FIG. 12, a fuel clad main body 44 is arranged in the vertical direction, and upper and lower fixing members 45 and 46 are attached to the respective ends of the fuel clad tube main body 44. The fuel clad tube main body 44 is supported by the upper and lower fixing members 45 and 46 so as to permit rotation in the arrowed direction a and vertical movement in arrowed direction b. Further, the device is designed to permit flow of argon gas inside the fuel clad tube main body 44 so as to protect the liner layer (not shown). At the midway point of the movement stroke of the fuel clad tube main body 44, a nozzle 47 is disposed. In accordance with the present invention aluminum oxide is flame-sprayed from the nozzle 47 on the outer surface of the fuel clad tube main body 44.

For manufacturing a fuel rod, at first the inner and outer surfaces of the fuel clad tube main body 44 are cleaned, as illustrated in FIG. 13. Then, aluminium oxide is flame-sprayed on the outer surface of the fuel clad tube main body 44 via the device illustrated in FIG. 12. More particularly, aluminium oxide is flame-sprayed on the outer surface of the fuel clad tube main body 44 from a portion 50 cm below the upper end thereof to a portion 50 cm above the lower end thereof until the thickness of the layer reaches 25 μm with a void ratio of 5%. From the nozzle 47, aluminium oxide which is melted by heating is sprayed together with air on the surface of the fuel clad tube main body 44, during which the fuel clad tube main body 44 is moved in the arrowed direction b while rotating in the arrowed direction a so as to form a metal oxide layer of aluminium oxide.

After forming an aluminium oxide layer of, for example, a layer thickness of 25 μm with a void ratio of 5% on the surface of the fuel clad tube main body 44, a lower end plug for the fuel clad tube is welded, and then fuel pellets and plenum springs are loaded and finally an upper end plug is welded to complete the fuel rod.

Figure 14:
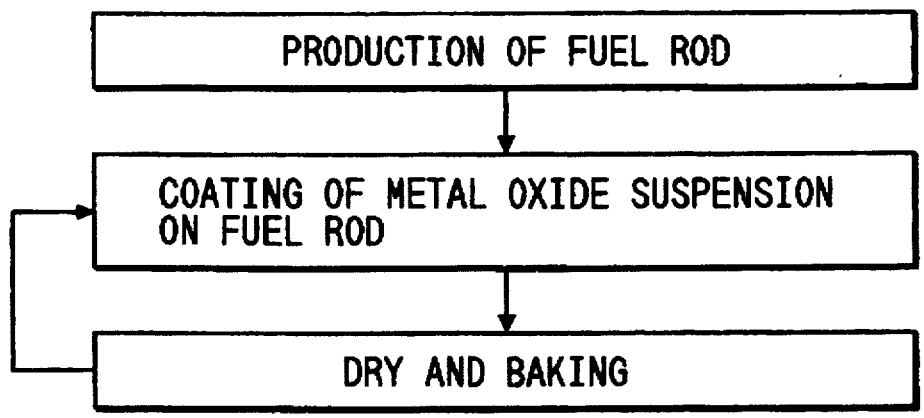
FIG. 14 is a view for explaining manufacturing processes according to the present invention.

FIG. 14 is a diagram illustrating a manufacturing process for fuel rods according to the present invention.

The fuel rod according to the invention is at first manufactured according to a conventional process.

Then, a suspension of zirconium oxide is coated on the thus manufactured fuel rod, is dried and then baked, so as to form a zirconium oxide layer on the outer surface of the fuel rod, and these processes are repeated until the thickness of the zirconium oxide layer has reached to 20 μm.

The fuel clad tube according to the invention can be simply realized by adding the coating, drying and baking processes of the zirconium oxide suspension at the end of the conventional manufacturing processes for the fuel rod.

In the present invention, a metal oxide layer can be formed on the outer surface of the fuel clad tube by dipping the same in a suspension of a metal oxide other than zirconium oxide and thereafter by heating and drying. Further, a metal oxide layer can be formed on the outer surface of the fuel clad tube by coating a solution containing metal ions and thereafter by drying.

Still further, in order to form a metal oxide layer on the outer surface of the Zr liner type fuel clad tube, a physical evaporation method and a chemical evaporation method can be used, for example.

Moreover, for the metal elements in the metal oxides, such as Fe, Y, Zr, Nb and Mo, other than Be, Ti and Al,can be used.

According to the reactor water control method for a BWR power plant of the present invention, as has been explained hitherto, an operation for accelerating crud deposition on the fuel rod is incorporated, so that the crud deposition amount on newly loaded fuel rods reaches a predetermined target value within the operation cycle concerned and the crud deposition acceleration is terminated after the crud deposition amount has reached the predetermined target value. Therefore, even if fuel rods, such as Zr liner type fuel rods, are newly loaded on an outer surface on which metal ions hardly deposit, the metal ions are caused to efficiently deposit on the surface of the fuel rods, whereby radioactivity in the reactor water can be effectively reduced.

Further, according to the BWR power plant having a low reactor water radioactivity concentration of the present invention, a device is provided which acceleratingly forms a metal oxide layer on the surface of the newly loaded fuel assemblies during starting operation of the BWR power plant, and therefore, with the above device, the reactor water control method of the present invention as indicated above can be performed without fail. In this regard, metal ions can be efficiently deposited even on surfaces of the newly loaded fuel assemblies on which metal ion deposition has been difficult, whereby the radioactivity in the reactor water can be effectively reduced.

Still further, for the fuel clad tube for BWRs according to the present invention, since a metal oxide layer is formed at least on a part of the outer surface of the fuel clad tube, radioactive materials in the reactor water precipitate and deposit on the metal oxide layer formed on the outer surface of the fuel clad tube, and are anchored thereon, and therefore, even with the fuel clad tube for BWRs according to the present invention, elements such as metal ions can be efficiently deposited on the newly loaded fuel assemblies, whereby the radioactivity in the reactor water can be effectively reduced.

We claim:

1. A reactor water control method for a BWR power plant comprising the steps of:

loading new fuel rods formed with Zr liner type fuel clad tubes in the BWR power plant;

performing a step of at least one of injecting iron crud in a high concentration into the reactor water, injecting a metal element having a low solubility into the reactor water, and shifting the pH of the reactor water to the alkaline side so as to accelerate deposition speed of at least one of the iron crud and metal element on the newly loaded fuel rods formed with Zr liner type fuel clad tubes at an initial stage in an operation cycle of the BWR power plant after loading the new fuel rods formed with Zr liner type fuel clad tubes in the BWR power plant until a deposition amount of at least one of the iron crud and the metal element on the newly loaded fuel rods formed with Zr liner type fuel clad tubes reaches a target value; and terminating said step of at least one of injecting iron crud, injecting a metal element and shifting so as to terminate the acceleration of the deposition speed after the deposition amount of at least one of the iron crud and the metal element has reached the target value;

wherein the metal element having the low solubility is at least one element selected from the group consisting of Zr, Al, Nb, Y and Ti.

2. A reactor water control method for a BWR power plant according to claim 1, wherein the target value is set at a value of at least 30 µg/cm$^2$ as an average.

3. A reactor water control method for a BWR power plant comprising the steps of:

loading new fuel rods formed with Zr liner type fuel clad tubes in the BWR power plant;

performing the step of injecting iron crud in a high concentration and a metal element having a low solubility into the reactor water so as to accelerate deposition speed of the iron crud and the metal element on the newly loaded fuel rods formed with Zr liner type fuel clad tubes at an initial stage in an operation cycle of the BWR power plant after loading the new fuel rods formed with Zr liner type fuel clad tubes in the BWR power plant until a total amount of the injected iron crud and the metal element exceeds a value which is determined by a product of a target deposition amount of the iron crud and the metal element on the newly loaded fuel rods formed with Zr liner type fuel clad tubes per unit area multiplied by a value representing the entire surface area of the newly loaded fuel rods formed with Zr liner type fuel clad tubes; and terminating the step of injecting after the total amount of the injected iron crud and the metal element has reached the value;

wherein the metal element having the low solubility is at least one element selected from the group consisting of Zr, Al, Nb, Y and Ti.

4. A reactor water control method for a BWR power plant according to claim 3, wherein a target of the iron crud and the metal element deposition amount is set at a value of at least 30 µg/cm$^2$ as an average.

5. A reactor water control method for a BWR power plant comprising the steps of:

loading new fuel rods formed with Zr liner type fuel clad tubes in the BWR power plant;

performing the step of controlling the pH of the reactor water in a range of more than 7 and less than 9 so as to accelerate deposition speed of crud contained in the reactor water on the newly loaded fuel rods formed with Zr liner type fuel clad tubes at an initial stage in an operation cycle of the BWR power plant after loading the new fuel rods formed with Zr liner type fuel clad tubes in the BWR power plant at least until a deposition amount of the crud on the newly loaded fuel rods formed with Zr liner type fuel clad tubes reaches a target value; and terminating the controlling step and reducing the pH of the reactor water to less than 7 after the deposition amount of the crud has reached the target value.

6. A reactor water control method for a BWR power plant according to claim 5, wherein the target value is set at a value 30 µg/cm$^2$ as an average.

* * * * *